US008846127B2

(12) United States Patent
Furuta et al.

(10) Patent No.: US 8,846,127 B2
(45) Date of Patent: Sep. 30, 2014

(54) TASTE-IMPROVING AGENTS AND TEA DRINKS CONTAINING THEREOF (75) Inventors: Hiroki Furuta, Kawasaki (JP); Hideki Maki, Kawasaki (JP)

(73) Assignee: Suntory Beverage & Food Limited, Tokyo (JP)

( * ) Notice: Subject to any disclaimer, the term of this patent is extended or adjusted under 35 U.S.C. 154(b) by 0 days.

(21) Appl. No.: 12/933,052

(22) PCT Filed: Mar. 17, 2009

(86) PCT No.: PCT/JP2009/055188
§ 371 (c)(1),
(2), (4) Date: Jan. 5, 2011

(87) PCT Pub. No.: WO2009/116538
PCT Pub. Date: Sep. 24, 2009

(65) Prior Publication Data
US 2011/0104358 A1 May 5, 2011

(30) Foreign Application Priority Data
Mar. 17, 2008 (JP) ................. 2008-068184

(51) Int. Cl.
A23F 3/00 (2006.01)
A23F 3/18 (2006.01)
A23L 1/22 (2006.01)
A23F 3/14 (2006.01)
A23F 3/16 (2006.01)
A23F 3/40 (2006.01)

(52) U.S. Cl.
CPC . *A23F 3/163* (2013.01); *A23F 3/14* (2013.01); *A23F 3/40* (2013.01)
USPC ............................ 426/597; 426/435; 426/650

(58) Field of Classification Search
CPC .............. A23F 3/40; A23F 3/14; A23F 3/163
USPC ........................................... 426/597, 435, 52
See application file for complete search history.

(56) References Cited

U.S. PATENT DOCUMENTS

| 5,827,560 A | 10/1998 | Fu et al. | |
| 6,387,428 B1 * | 5/2002 | Kinugasa et al. | 426/597 |
| 7,279,193 B2 | 10/2007 | Oishi et al. | |
| 2006/0240167 A1 * | 10/2006 | Takahashi et al. | 426/597 |

FOREIGN PATENT DOCUMENTS

| EP | 0 008 485 A2 | | 3/1980 |
| EP | 941737 B1 * | | 6/2004 |
| JP | 05068479 A | | 3/1993 |
| JP | 05344843 A | | 12/1993 |
| JP | 08116881 A | | 5/1996 |
| JP | 08163958 A | | 6/1996 |
| JP | 09121770 A | | 5/1997 |
| JP | 9140331 A | | 6/1997 |
| JP | 10033116 A | | 2/1998 |
| JP | 11-276074 | | 10/1999 |
| JP | 11276074 A | | 10/1999 |
| JP | 2981137 | | 11/1999 |
| JP | 2000078946 A | * | 3/2000 |
| JP | 2000189055 A | | 7/2000 |
| JP | 2001045971 A | | 2/2001 |
| JP | 2001-247593 | | 9/2001 |
| JP | 2002125593 A | | 5/2002 |
| JP | 2002-238458 | | 8/2002 |
| JP | 2002281900 A | | 10/2002 |
| JP | 3360073 | | 12/2002 |
| JP | 2003093907 A | | 4/2003 |
| JP | 2003-144049 | | 5/2003 |
| JP | 2005-137286 | | 6/2005 |
| JP | 2005137286 A | * | 6/2005 |
| JP | 2005-176743 | | 7/2005 |
| JP | 2005-343814 | | 12/2005 |
| JP | 2005343814 A | * | 12/2005 |
| JP | 2006-61125 | | 3/2006 |
| JP | 3796539 | | 7/2006 |
| WO | WO2004/110161 | | 12/2004 |

OTHER PUBLICATIONS

Search Report dated Apr. 21, 2009 for International Patent Application No. PCT/JP2009/055188 filed Mar. 17, 2009.
Extended European Search Report dated Feb. 16, 2011, for European Patent Application No. 09723566.7; 5 pages.
Excerpt (pp. 56-57) of "The Science of Tea," published on Sep. 1, 1997, by Asakura Publishing Co., Ltd. (w/ partial English translation).
Comparison between mesh and micrometer in powers, available at http://www.meijiair.co.jp/html/gijutsu-siryou/gijutsu-siryou-mesh.html (w/ partial English translation).
Notice of Reasons for Refusal issued May 18, 2010, in Japanese Application No. 2005-506959 (with its English translation).
Japanese Office action issued Nov. 16, 2010, in Japanese Application No. 2005-506959 (in Japanese).

* cited by examiner

*Primary Examiner* — Humera Sheikh
*Assistant Examiner* — Subbalakshmi Prakash
(74) *Attorney, Agent, or Firm* — Drinker Biddle & Reath LLP (57) ABSTRACT

The present invention provides an agent for improving taste of tea drinks, comprising at least one glyceroglycolipid, preferably monogalactosyl diacylglycerol or digalactosyl diacylglycerol, as an active ingredient. The agent of the present invention is for use to enhance kokumi, to mask astringent taste, and to prevent precipitates. The agent of the present invention is effective especially in improving tea drinks containing ground tea leaves. The present invention also provides a method for producing tea drinks containing ground tea leaves and at least 1.0 μg/ml of glyceroglycolipids and having an absorbency of 0.25 or below at 680 nm, and tea drinks containing glyceroglycolipid, which method comprises grinding tea leaves into an average particle size of 1-100 μm (preferably 1-50 μm, more preferably 1-20 μm), and mixing the resulting ground tea leaves with neutral (pH 5-7, preferably 5.5-7, especially preferably 6-7) water to elute the glyceroglycolipids into the water.

10 Claims, 8 Drawing Sheets

TASTE-IMPROVING AGENTS AND TEA DRINKS CONTAINING THEREOF

CROSS REFERENCE TO RELATED APPLICATIONS

This application is the National Stage of International Application No. PCT/JP2009/055188, filed 17 Mar. 2009, and claims the benefit of Japanese Application No. 2008-068184, filed 17 Mar. 2008, both of which are herein incorporated by reference in their entirety.

TECHNICAL FIELD

The present invention relates to improvement in taste of tea drinks. In particular, the present invention relates to improvement in taste of tea drinks using as an active ingredient glyceroglycolipid which may be contained in a solvent extract of tea leaves.

BACKGROUND ART

In recent years, many tea drinks packaged in containers such as cans and PET bottles have been developed and sold. The market of tea drinks, especially green tea drinks, has been expanding. Consumers have shown a growing preference for such tea drinks, and there are demands for development of a packaged green tea drink that has stronger umami and kokumi while having a moderate astringent taste, similar to a tea drink prepared by brewing high-quality tea leaves having a high total nitrogen content, such as Gyokuro and Shincha, in a teapot.

Concerning tea drinks, it is disclosed that tea leaves that contain a large amount of amino acids such as theanine are selected to produce tea drinks (Patent Document 1). There is also disclosed a method of producing essence of teas with strong umami and kokumi by causing protease to act on raw materials of teas to hydrolyze protein contained in the raw materials of teas so that amino acids, which are sources of umami, such as glutamic acid are liberated (Patent Documents 2 and 3). It is also disclosed that a tea extract is dissolved into a solvent having a high polarity and the resulting mixture is subjected to HPLC to obtain a fraction after a retention time of 25-50 minutes, which fraction can be used as a taste enhancing agent to enhance umami and kokumi of food and drinks (Patent Document 4). There are also disclosed a method for obtaining a tea drink with excellent aroma and nourishing taste, comprising extracting in water or warm water an extract from fine powdered tea, and subjecting the resulting extract solution to centrifugal separation to separate and remove large particle components originating from the fine powdered tea (Patent Document 5), and a method for obtaining a green tea drink with a rich, deep taste, comprising removing fine particles from a solution of a green tea extract to prepare a transparent solution of the green tea extract, and adding a green tea powder to the transparent solution (Patent Document 6).

Concerning macromolecular components contained in a solvent extract of tea, it is reported that tea polysaccharides obtained from a tea extract in water or hot water by use of an ultrafiltration membrane having a molecular weight cut-off of at least 400000 can prevent absorption of excess lipids from meals (Patent Document 7). Concerning water-soluble macromolecules originating from tea leaves and the like, a drink containing non-epicatechins, epicatechins and water-soluble macromolecues is proposed as a drink with reduced bitterness and astringent taste of catechins (Patent Document 8).

Glyceroglycolipid is known as a component that is produced by microorganisms (Patent Documents 9 and 10). Glyceroglycolipid is also known as a component that is contained in a wide variety of membrane fractions of plants including teas (Non-Patent Document 1). In recent years, various physiological activities of glyceroglycolipid have been found, and attempts have been made to establish a method by which glyceroglycolipid for use as bases of foods, cosmetics, and pharmaceuticals can be produced efficiently and inexpensively from safe natural products (Patent Document 11).

Patent Document 1: Japanese unexamined patent publication No. 2002-238458 (Tokukai 2002-238458)
Patent Document 2: Japanese unexamined patent publication No. 2003-144049 (Tokukai 2003-144049)
Patent Document 3: Japanese unexamined patent publication No. 2006-61125 (Tokukai 2006-61125)
Patent Document 4: Japanese unexamined patent publication No. 2005-137286 (Tokukai 2005-137286)
Patent Document 5: Japanese unexamined patent publication No. 11-276074 (Tokukaihei 11-276074)
Patent Document 6: Japanese patent No. 2981137
Patent Document 7: Japanese unexamined patent publication No. 2005-176743 (Tokukai 2005-176743)
Patent Document 8: Japanese patent No. 3360073
Patent Document 9: Japanese unexamined patent publication No. 2001-247593 (Tokukai 2001-247593)
Patent Document 10: Japanese patent No. 3796539
Patent Document 11: Japanese unexamined patent publication No. 2005-343814 (Tokukai 2005-343814)

DISCLOSURE OF THE INVENTION

Means for Solving the Problems

Tea brewed in a teapot is generally consumed while it is warm so that strong aroma of the tea with steam can be sensed, with sensations of moderate astringent taste, umami and kokumi. However, a tea drink packaged in a container, especially a transparent container such as a PET bottle and a glass bottle, is produced by a process including removal of particles of tea leaves and fine pieces of tissue of the tea leaves from an extract solution of the tea leaves to prevent precipitates during storage, and is often consumed at a room temperature or below (e.g., refrigerant temperature). Thus, such a tea drink is not satisfactory in terms of characteristic palatability of tea (taste, preference), and has disadvantages of having insufficient kokumi and umami of tea to be thin and watery, with disharmony between kokumi, umami and bitterness, astringent taste of catechins.

The present inventors attempted to separate a fraction that serves as a kokumi component of tea drinks. Consequently, the present inventors found that a component/s having a correlation with kokumi were contained in a soluble-macromolecule-containing fraction that might be contained in a particular tea extract, which contained a macromolecule/s having a weight of at least 300,000, and was detected by absorption at 400 nm in gel filtration chromatography. The present inventors revealed that the soluble-macromolecule-containing fraction was not contained in an extract of common tea leaves in water or hot water, but was present in a solvent extract of tea leaves having broken cell walls, such as tea leaves finely ground by a stone mill.

The soluble-macromolecule-containing fraction containing a macromolecule/s having a weight of at least 300,000 detected by absorption at 400 nm in gel filtration chromatography was further fractionated to search for a component/s effective for improving kokumi; consequently, glyceroglycolipids were identified. Furthermore, it was found that a tea drink that was adjusted to contain at least 0.30 µg/ml (pigment equivalent) of a soluble-macromolecule-containing fraction containing a macromolecule/s having a molecular weight of at least 300,000 and detected by absorption at 400 nm, i.e., at least 1.0 µg/ml of glyceroglycolipids, had strong kokumi and richness. With the foregoing findings, the present invention was completed.

Specifically, the present invention is as follows:

(1) a tea drink comprising a ground tea leaf and at least 1.0 µg/ml of glyceroglycolipids, and having an absorbency of 0.25 or below at 680 nm;

(2) the tea drink of (1), comprising at least 0.002 parts by weight of the glyceroglycolipids per 1 part by weight of catechins;

(3) the tea drink of (1) or (2), wherein a proportion of the glyceroglycolipids to an insoluble solid content ((amount of glyceroglycolipids (µg/ml))/(absorbency at 680 nm)) is 7 or above;

(4) an agent for improving a taste of a tea drink, comprising at least one glyceroglycolipid as an active ingredient;

(5) the agent of (4), wherein the active ingredient is monogalactosyl diacylglycerol or digalactosyl diacylglycerol;

(6) the agent of (4) or (5) for enhancing kokumi, masking astringent taste, and preventing a precipitate;

(7) the agent of (6), wherein the tea drink contains a wet-grinding product of a ground tea leaf;

(8) a method for producing a tea drink containing glyceroglycolipids, comprising: grinding a tea leaf into an average particle size 1-100 µm (preferably 1-50 µm, more preferably 1-20 µm); and mixing the resulting ground tea leaf with water having a temperature effective for extraction of glyceroglycolipids to elute glyceroglycolipid into the water;

(9) the method of (8), further comprising, after the mixing of the powdered tea leaf with water, wet grinding by use of a high-pressure homogenizer under a neutral condition (pH 5-7, preferably 5.5-7, especially preferably 6-7); and (10) a method for improving a taste of a tea drink, using glyceroglycolipid.

Advantages of the Invention

The present invention makes it possible to produce tea drinks that are improved in kokumi.

A soluble-macromolecule-containing fraction, i.e., glyceroglycolipid, contained in an agent of the present invention for improving taste of a tea drink is a component that is contained in high-quality tea leaves in a very small amount. A tea drink containing the taste-improving agent is provided as a luxurious tea drink that has robust natural sweetness of high-quality tea even when it is consumed at a room temperature or below, specifically at a refrigerant temperature (approximately 0-20° C.).

The agent of the present invention for improving taste of tea drinks is a soluble-macromolecule-containing fraction originating from tea leaves; thus, the agent can be added to tea drinks so that umami and kokumi (especially kokumi) are improved without causing any problem of a strange taste or odd feeling in a throat.

The present invention further provides a tea drink that is less likely to form a precipitate, which is often formed in powder tea drinks, while having an advantage of drinks containing a large amount of powdered tea leaves; namely, kokumi is enhanced. Tea drinks of the present invention are excellent in long-term storage stability, compared with conventional tea drinks.

The present invention makes it possible to produce tea drinks that unpleasant tastes of catechins (e.g., bitterness and astringent taste of catechins) and the like are masked.

A tea extract that is extracted from tea leaves in water and has a high concentration of glyceroglycolipids contains no organic solvent; thus, such a tea extract can be added directly to a drink (especially non-alcohol drink) when used as the taste-improving agent of the present invention.

BEST MODE FOR CARRYING OUT THE INVENTION (Taste-improving Agent)

An agent of the present invention for improving taste of tea drinks is a solvent extract of tea leaves and contains as an active ingredient a soluble-macromolecule-containing fraction that has a molecular weight of at least 300,000 and is detected by absorption at 400 nm in gel filtration chromatography. The term "soluble-macromolecule-containing fraction" as used herein refers to a void component that is detected by absorption at 400 nm after a retention time of approximately 6 minutes in gel filtration chromatography performed on a liquid having passed through a membrane filter (with a pore size of 0.45 μm, JUJI FIELD INC.) when a solvent extract of tea leaves or a tea drink is filtrated using the membrane filter (refer to FIG. 1).

An extract of tea leaves in warm water contains almost no soluble-macromolecule-containing fraction. On the other hand, an extract of high-quality tea leaves, such as Gyokuro, Kamairitamaryokucha, and Fukamushicha, in warm water contains a very small amount of the soluble-macromolecule-containing fraction (refer to FIG. 3).

The agent of the present invention for improving taste of tea drinks is a solvent extract of tea leaves and contains glyceroglycolipid as an active ingredient. Glyceroglycolipid in the present invention is a glycolipid in which a sugar chain constituted of 1 to 3 monosaccharides is ester-linked to diacyl glycerol. Examples of monosaccharides that constitute the sugar chain contained in the glyceroglycolipid include galactose, glucose, mannose, fructose, xylose, arabinose, fucose, quinovose, rhamnose, and sulfoquinovose. Examples of acyl groups include saturated or unsaturated, straight or branched-chain fatty acid residues having 6-24 carbon atoms; namely, linolenic acid, linoleic acid, oleic acid, stearic acid, and palmitic acid.

Glyceroglycolipid in the present invention includes at least monogalactosyl diacylglycerol (MGDG) and digalactosyl diacylglycerol (DGDG). It is thought that glyceroglycolipid in a drink is present as a colloidal dispersion system.

The agent of the present invention can be used to enhance kokumi of tea drinks, mask bitterness and astringent taste of tea drinks, especially bitterness and astringent taste of catechins, and prevent precipitates in a tea drink. The agent of the present invention is especially effective for improving taste of tea drinks containing ground tea leaves (including Maccha and ground Maccha). As used herein, the term "kokumi" refers to richness with excellent mouthfeel. Specifically, the term refers to richness with smooth mouthfeel and without any unpleasant mouthfeel or texture such as "sliminess" and "stickiness" of hydrophilic colloidal gum (macromolecular gum) or water-soluble starch used to increase viscosity and the like.

Catechins in the present invention are catechin, gallocatechin, catechin gallate, gallocatechin gallate, epicatechin, epigallocatechin, epicatechin gallate, and epigallocatechin gallate. A catechins content in the present invention indicates a total amount of the foregoing catechins. A tea drink of the present invention contains 0.20 mg/ml to 5.0 mg/ml of catechins.

Maccha is tea leaves that are prepared as follows. Shade-grown tea leaves shielded from light are steamed and then cooled, and, without kneading the tea leaves, the tea leaves are dried in a Tencha apparatus for drying. The resulting dried leaves are cut into small pieces, and stems are removed, followed by further drying to prepare Tencha. The resulting Tencha is ground by a millstone into a powder. Grinding, such as the grinding by a millstone, to break cell walls of tea leaves enables a soluble-macromolecule-containing fraction containing glyceroglycolipid, which is a cell membrane component, to be eluted. Accordingly, as long as a method of the present invention for the production of a taste-improving agent includes grinding tea leaves sufficiently to break cell walls and subjecting the ground tea leaves to solvent extraction to elute a cell membrane component (soluble-macromolecule-containing fraction containing glyceroglycolipid), kinds of tea leaves for use as raw materials, techniques for grinding tea leaves, grinding sizes, and the like in the method of the present invention are not particularly limited (refer to FIG. 4). A grinding size is, for example, an average particle size (median size) of 1-100 μm, preferably 1-50 μm, more preferably 1-20 μm.

Methods for the solvent extraction of ground tea leaves are not particularly limited; generally, extraction is carried out using 5-100 parts by weight, preferably 10-90 parts by weight of a solvent with respect to ground tea leaves. Generally, ground tea leaves are dispersed into an adequate amount of a solvent and stirred to carry out extraction. The solvent for use in the extraction is not particularly limited, as long as it can be used as food. Examples include water such as distilled water, demineralized water, tap water, alkali ion water, deep seawater, ion-exchange water, and deoxygenated water, and organic solvents such as water-containing alcohol, alcohol, and hexane. Use of water is especially preferred in view of its ease of use in tea drinks, which are non-alcohol drinks. An extraction temperature can be set appropriately, but extraction at low temperatures can prevent bitter and astringent components of catechins and the like from being extracted, making an agent more useful for enhancing kokumi. On the other hand, extraction at high temperatures causes elution of a large amount of water-soluble components including macromolecular components, such as pectin and hemicellulose, that cause aggregation, and these components and glyceroglycolipid may precipitate when cooled. To attain a high glyceroglycolipid yield, extraction at low temperatures is preferred. The low temperatures are about 5-50° C., preferably 10-40° C.

An extraction time varies according to a temperature of the solvent, an amount of the solvent that is used, and a level of stirring, but is generally 30 seconds to 30 minutes, preferably 1 minute to 10 minutes. An antioxidant, such as L-ascorbic acid, or a pH adjuster, such as sodium acid carbonate, may be added at a time of or after extraction, but the extraction is performed preferably under a condition close to a neutral condition, e.g., pH 5 to 7, preferably 5.5 to 7, especially preferably 6 to 7; under an acidic condition, a glyceroglycolipid yield decreases because it is likely that glyceroglycolipid is not eluted easily, that glyceroglycolipid precipitates, and that glyceroglycolipid decomposes.

Figure 5:
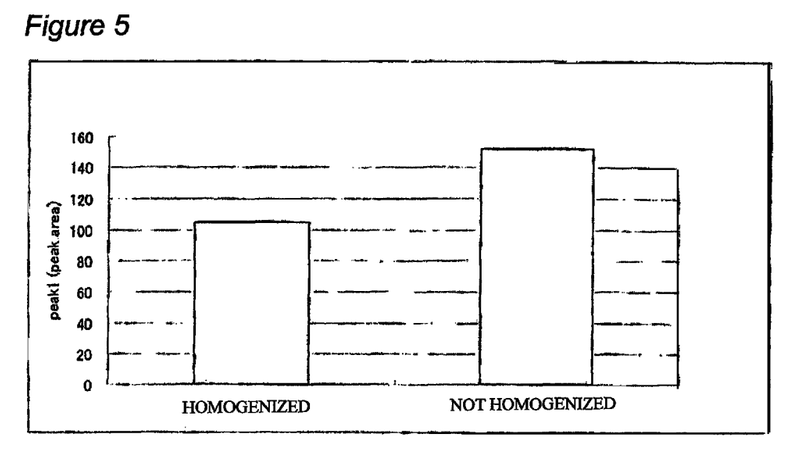
FIG. 5 is a graph showing how processing by a high pressure homogenizer affects elution of the component specified by peak 1.
Figure 6:
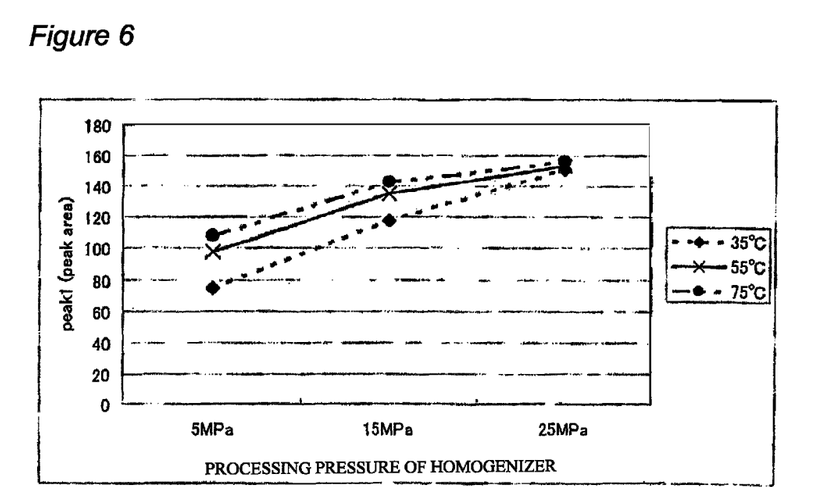
FIG. 6 is a graph showing how an extraction temperature and a pressure of the high pressure homogenizer affect elution of the component specified by peak 1.

If a solvent extract in which ground tea leaves are being suspended in an extraction solvent is finely ground by a high pressure homogenizer, an amount of eluted macromolecular fraction containing glyceroglycolipid increases (refer to FIGS. 5 and 6). It is therefore preferable that wet grinding be performed by use of a high pressure homogenizer either concurrently with or after solvent extraction of ground tea leaves. A high pressure homogenizer is an apparatus that breaks emulsion droplets and suspended particles into very small pieces by shear, cavitation, and the like produced when an extract solution is jetted from a fine aperture at high speed under high pressure. For the taste-improving agent of the present invention, not only a high pressure homogenizer but also any apparatus that can elute a large amount of a soluble-macromolecule-containing fraction from ground tea leaves may be used. In the case of using a high pressure homogenizer, an amount of eluted soluble fraction has a tendency to increase with higher pressure of the high pressure homogenizer. However, if the pressure is too high, eluted glyceroglycolipid is likely to decompose, precipitate with other eluted components, and the like. Thus, it is preferable that the pressure of the high pressure homogenizer be 50-1000 kg/cm2, preferably 100-500 kg/cm2 or higher, more preferably 100-300 kg/cm2.

The processing by a high pressure homogenizer is carried out under a condition close to a neutral condition, e.g., pH 5-7, preferably 5.5 to 7, especially preferably 6 to 7; under an acidic condition, a glyceroglycolipid yield decreases because it is likely that glyceroglycolipid is not eluted easily, that glyceroglycolipid precipitates, and that glyceroglycolipid decomposes.

Since the taste-improving agent of the present invention is a soluble component, it is preferable that separation and clarification, such as centrifugal separation and filtration, be carried out on the solvent extract of ground tea leaves or wet-ground product to remove insoluble solid contents. Specifically, it is preferable to carry out separation and clarification that can remove most of insoluble solid content particles having a particle size of 1 μm or greater. The phrase "most of" as used herein refers to 50% or above, preferably 90% or above, more preferably 95% or above, especially preferably 99% or above. After such fine grinding and clarification are carried out, the resulting tea leaves have an average particle size of approximately 0.1 μm to 1 μm, preferably 0.3 μm to 1 μm.

Component analysis was performed on the soluble-macromolecule-containing fraction that is an active ingredient of the taste enhancing agent of the present invention, and it was found that the soluble-macromolecule-containing fraction contained glyceroglycolipid and chlorophyll. Glyceroglycolipid is a kind of glycolipids having a glycerol molecule backbone to which a sugar residue and an acyl group such as fatty acid are attached, and is an amphipatic substance having a hydrophilic sugar residue and a hydrophobic acyl in a molecule. A mechanism of the action of the taste-improving agent of the present invention in the soluble-macromolecule-containing fraction is not revealed yet, but it is reasonable to infer that glyceroglycolipid present as a colloidal dispersion system forms weak associations with other components in tea leaves to give richness and kokumi. A known method to produce glyceroglycolipid from tea leaves is to extract glyceroglycolipid from used tea leaves by use of an organic solvent (Japanese unexamined patent publication No. 2005-343814). While physiological activities of glyceroglycolipid have been known, tastes that glyceroglycolipid gives to tea drinks were not known. It was also not known that a large amount of components containing glyceroglycolipid could be obtained if extraction was carried out after grinding was carried out to break cell walls. The foregoing findings are revealed for the first time by the present invention. The present invention also has an advantage that a tea extract having a high concentration of glyceroglycolipid can be obtained without the use of an organic solvent.

The taste-improving agent of the present invention can be used in any form, as long as it contains a predetermined amount of glyceroglycolipid. Specific examples include a method of using the agent by either adding a solvent extract of ground tea leaves directly to a tea drink or diluting the solvent extract with water or with a tea extract solution and then adding the diluted solvent extract to a tea drink, and a method of using the agent by concentrating a solvent extract, in some cases followed by further drying, to obtain essence or powder, and adding the essence or powder to a tea drink. The essence and dried powder can be prepared by publicly-known methods. The taste-improving agent of the present invention can also be used in a form of a pure refined product (liquid or powder) produced by refining an active ingredient, a soluble-macromolecule-containing fraction or glyceroglycolipid, from a solvent extract of ground tea leaves by gel filtration chromatography or any other publicly-known isolation method.

The agent of the present invention can provide kokumi to a tea drink without giving any unpleasant mouthfeel or texture such as "sliminess" and "stickiness," regardless of a temperature of the tea drink at which the tea drink is consumed. The agent of the present invention is a component extracted from tea leaves with water and can provide natural richness.

An amount of the agent of the present invention to be used can be selected appropriately according to an intended use. In the case of using the agent to enhance kokumi of tea drinks, if glyceroglycolipid or a tea extract containing glyceroglycolipid is added to a tea drink such that the tea drink contains at least 1.0 μg/ml of glyceroglycolipid, the tea drink has rich kokumi even when it is stored at a room temperature or below, e.g., refrigerant state, and consumed while it is in the refrigerant state. In the case of using the agent of the present invention to enhance kokumi, the agent is generally blended in an amount of about 1000 μg/ml or below, preferably 500 μg/ml or below, more preferably 400 μg/ml or below, especially preferably 350 μg/ml or below, but an upper limit of the amount is not particularly limited.

(Tea Drinks)

The term "tea drinks" as used herein refers to solvent extracts of raw leaves of plants that belong to the *camellia* genus (academic name: *Camellia sinensis*), solvent extracts of non-fermented tea obtained by processing the raw leaves, and solvent extracts of semi-fermented tea obtained by processing the raw leaves. Especially, green tea drinks (non-fermented tea) that kokumi is a key factor of the taste are targeted.

A tea drink of the present invention is characterized by containing at least 0.30 μg/ml, pigment equivalent, preferably 0.50 μg/ml, of the soluble-macromolecule-containing fraction having a molecular weight of at least 300,000 and detected by absorption at 400 nm in gel filtration chromatography, i.e., at least 1.0 μg/ml, preferably at least 1.5 μg/ml, of glyceroglycolipid, so that umami and kokumi (especially kokumi) are enhanced while astringent taste and bitterness are not enhanced. In this specification, a concentration of the soluble-macromolecule-containing fraction is indicated by an equivalent amount of Food Yellow No. 4. Food Yellow No. 4 is a compound that is also called tartrazine (chemical formula: C16H9N4Na3O9S2). Unless otherwise specified, a total amount of MGDG and DGDG is used to indicate a concentration of glyceroglycolipid in this specification. Those skilled in the art can appropriately perform the measurement using an available means, but the Examples described in this specification can be referred to for detailed conditions.

The tea drink of the present invention contains at least 1.0 μg/ml, preferably not less than 1.5 μg/ml, of glyceroglycolipid, and this prevents precipitates that are often formed in powder tea drinks during long-term storage. Accordingly, drinks containing tea powder are one of the preferred embodiments of the present invention. The drinks containing tea powder are drinks that contain ground tea leaves; specifically, tea drinks that are obtained by blending ground tea leaves (e.g., Maccha) and contain insoluble solid contents such as fine pieces of tissue of ground tea leaves and green tea particles. Precipitates are prevented in the powder tea drinks containing an insoluble solid content having an average particle size of smaller than 1 μm, compared with those with an average particle size of 1 μm or larger, but the problem of formation of precipitates is not completely solved with regard to packaged tea drinks that are stored at room temperature for a long period of time, such as those stored at room temperature for three months or longer. However, in the tea drink of the present invention containing at least a specific amount of glyceroglycolipid, the glyceroglycolipid is present as a colloidal dispersion system to prevent aggregate precipitates, precipitates of insoluble solid contents, and the like during long-term storage of the tea drink, and therefore the tea drink of the present invention is less likely to form precipitates that are often formed in powder tea drinks. A proportion of ground tea leaves to be blended to a tea drink is generally about 0.02-0.5 weight %, preferably about 0.03-0.4 weight %. Note that the tea powder-containing drink is adjusted to have an absorbency of 0.02-0.25, preferably 0.02-0.20, more preferably 0.02-0.15, at 680 nm. The tea powder-containing drink thus adjusted to have an absorbency within the specific range has an advantage of drinks containing a large amount of powdered tea leaves, i.e., enhanced kokumi, and have clear aftertaste without giving any characteristic astringency of ground tea leaves or roughness originating from insoluble components, and the effect of preventing precipitates is significantly produced in the powder-containing drink. Specifically, a tea drink that contains glyceroglycolipid at a proportion {(amount of glyceroglycolipids (µg/ml))/(absorbency at OD680 nm)} of 7 or above, preferably 10 or above, more preferably 12 or above, with respect to insoluble components is the drink without any characteristic astringency of ground tea leaves or roughness originating from insoluble components.

The tea drink of the present invention contains at least 1.0 µg/ml, preferably at least 1.5 µg/ml, of glyceroglycolipids to mask characteristic bitterness and astringent taste of catechins. Accordingly, a catechin-containing tea drink having a high concentration of catechins is one of the preferred embodiments of the tea drinks of the present invention. The catechin-containing tea drinks is a tea drink containing catechins in an amount of 0.10-5.0 mg/ml, preferably 0.20-4 mg/ml, more preferably 0.25-3 mg/ml, even more preferably 0.30-2 mg/ml, especially preferably 0.35-1 mg/ml. Catechins have physiological effects such as prevention of increase in cholesterol and inhibition of alpha-amylase. To obtain such physiological effects, an adult person is required to consume 4-5 cups of tea per day. To facilitate an intake of a large amount of catechins, there have been demands for a technique for blending a high concentration of catechins to a drink, i.e., a technique for masking characteristic bitterness and astringent taste of catechins while maintaining an original taste of tea. Glyceroglycolipid, which is amphipatic, acts to include catechins and forms a colloidal dispersion system; thus, bitterness and astringent taste of catechins in the tea drink of the present invention containing at least a specific amount of glyceroglycolipid can be masked, making it possible to blend a high concentration of catechins. To mask bitterness and astringent taste, the tea drink of the present invention contains 0.002-0.025 parts by weight, preferably 0.002-0.020 parts by weight, more preferably 0.003-0.015 parts by weight of glyceroglycolipid per 1 part by weight of catechins. A tea drink (green tea drink) having concentrations of glyceroglycolipid and catechins within the above range has a harmonious balance between kokumi, umami of tea and bitterness, astringent taste of catechins to have moderate astringent taste and stronger umami and kokumi even when the tea drink is consumed while it is at a room temperature or below.

If the tea drink of the present invention containing a high concentration of catechins is a tea powder-containing drink, characteristic astringency of ground tea leaves may inhibit the activity of masking bitterness and astringent taste of catechins. Thus, in the case of the tea powder-containing drink, the tea drink is adjusted to have the absorbency specified above, i.e., an absorbency of 0.02-0.25, preferably 0.02-0.20, more preferably 0.02-0.15, at 680 nm.

The higher a glyceroglycolipid content in a tea drink is, the more the effects of enhancing kokumi of the tea drink, masking bitterness and astringent taste of catechins, and preventing precipitates are produced. The glyceroglycolipid content may be selected according to a desired level of the effects, but about 1000 µm/ml or below, preferably 500 µg/ml or below, more preferably 400 µg/ml or below, especially preferably 350 µg/ml or below is suitable in view of an aroma as a tea drink.

The taste-improving agent of the present invention may be added directly to the tea drink of the present invention or may be diluted with water and then added to the tea drink of the present invention, but the resulting tea drink may only have kokumi. Thus, to obtain a tea drink having moderate astringent taste and enhanced umami and kokumi, it is preferable that the taste-improving agent be added to a tea extract solution to produce the tea drink. Specifically, it is preferable that the tea drink of the present invention be produced by the following steps:

(1) breaking cell walls of tea leaves to obtain ground tea leaves;

(2) obtaining a solvent extract of the ground tea leaves; and (3) blending the solvent extract to obtain a tea drink containing at least 0.30 µg/ml (pigment equivalent) of a soluble-macromolecule-containing fraction having a molecular weight of at least 300,000 and detected by absorption at 400 nm in gel filtration chromatography, i.e., at least 1.0 µg/ml of glyceroglycolipid.

It is preferable that in the step 3), the solvent extract of the ground tea leaves be mixed with a solvent extract solution of the tea leaves that was prepared separately (hereinafter "tea extract solution") to produce a tea drink having a predetermined concentration of the soluble-macromolecule-containing fraction.

A tea extract solution that serves as a base to which the taste-improving agent of the present invention is to be added is an ordinary tea drink that is obtained by extracting with a solvent (preferably water) ordinary tea leaves that are not ground, and then separating the tea leaves by filtration. Tea leaves for use as raw materials of the tea extract solution and extraction conditions may be determined appropriately according to a desired aroma of tea drinks. To give moderate astringent taste to tea drinks, use of a tea extract solution prepared by extraction at high temperatures (about 60-90° C.) is preferred. Note that an antioxidant, such as L-ascorbic acid, or a pH adjuster, such as sodium acid carbonate, may be added to the tea extract solution at a time of or after the extraction.

As stated above, the cells walls of the tea leaves are broken to obtain ground tea leaves so that a soluble-macromolecule-containing fraction, which is a kokumi enhancing component, in a cell membrane can be eluted. Likewise the taste-improving agent, specific grinding methods, grinding sizes, and the like are not particularly limited, as long as cell walls can be broken, but stone grinding is preferred. Extraction conditions are the same as those for the production of the taste-improving agent.

For the tea drink of the present invention, it is preferable that, in addition to the steps (1) to (3), a step of clarification (step 4), such as centrifugal separation and filtration, be included following the step (2). The clarification such as centrifugal separation and filtration can remedy roughness and unpleasant aftertaste caused by insoluble solid contents such as fine pieces of tissue of ground tea leaves and green tea particles, and can prevent precipitates during storage. As described above, the taste improving component of the present invention is a soluble macromolecule; thus, the taste improving component is not decreased by the clarification.

Conditions for the separation and clarification, such as centrifugal separation and filtration, may be determined appropriately. If the clarification conditions are determined such that a tea drink has an absorbency of 0.25 or below at 680 nm, the resulting tea drink has clear aftertaste without roughness, and the effect of the present invention, i.e., enhanced kokumi, can be sensed more. Specific centrifugal separation conditions include clarification that can remove most of the insoluble solid content particles having a particle size of 1 μm or greater. The phrase "most of" as used herein refers to 50% or above, preferably 90% or above, more preferably 95% or above, especially preferably 99% or above.

The present invention provides packaged tea drinks (especially green tea drink) having enhanced umami and kokumi while having characteristic moderate astringent taste of tea drinks. The tea drinks of the present invention are produced by the foregoing steps (1) to (3), preferably (1) to (4). The tea drinks thus produced are sterilized and packaged into containers, or are packaged into containers and then heated for sterilization (e.g., retort sterilization) to produce packaged tea drinks. For instance, to produce a canned drink, a predetermined amount of the tea drink is canned and retort sterilized (e.g., 1.2 mmHg, 121° C., 7 minutes). To produce PET-bottled tea drinks, tea drink cartons, or bottled tea drinks, for example UHT sterilization, which includes keeping the drinks at 120-150° C. for one second to several tens of seconds, or the like is performed, and predetermined amounts of the drinks are packaged by hot-filling or aseptic filling at low temperature. Since the packaged tea drinks of the present invention are to provide tea drinks with excellent taste, the aseptic filling at low temperature is preferred.

Any commonly-used container, such as aluminum cans, steel cans, PET bottles, glass bottles, and paper containers, can be used as containers for the tea drinks of the present invention. The packaged tea drinks of the present invention produced as described above contain glyceroglycolipid present as a colloidal dispersion system. The presence of the colloidal dispersion system not only provides kokumi but also prevent changes in flavor, color, precipitates, and the like during storage. This is favorable especially in the case of using transparent containers (e.g., PET bottle, glass bottle) as the packaging containers.

EXAMPLES

The present invention is described in detail below, with reference to Test Examples and Example. The present invention, however, is not limited to the description below.

Test Example 1

Analysis of Taste (Kokumi) Enhancing Component

An active ingredient providing kokumi was analyzed using packaged tea drinks (8 kinds) that were commercially available as PET bottled drinks. The tea drinks at 20° C. were stirred sufficiently to be uniform. Then, the tea drinks were opened and passed through a membrane filter (with a pore size of 0.45 μm, JUJI FIELD INC., unsterilized water system 13A) at room temperature. The filtrate was recovered and subjected to gel filtration chromatography (1100 series of Agilent). The analysis was performed as follows.

Gel filtration column: Shodex Asahipak GS520 HQ (company name, inner diameter of 7.6 mm×length of 300 mm, exclusion limit 300,000)
  Amount of introduced sample: 10 μl
  Flow rate: 0.5 ml/min.
  UV-VIS detector: Agilent, 1100 series, G1315B DAD
  Wavelength set for detection: 400 nm
  Eluant: water
  Temperature: 40° C.

Figure 1:
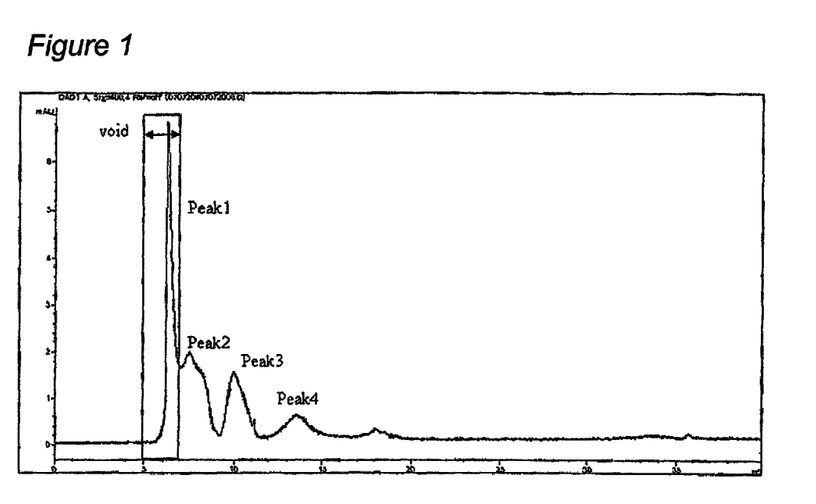
FIG. 1 is a chart of gel filtration chromatogram indicating an active ingredient that is contained in a tea drink and provides kokumi.

Some of the measurement results are shown in FIG. 1. Roughly four peaks were detected in the green tea drinks. The four peaks were: a fraction (void fraction; hereinafter "peak 1") that was eluted by 40% after a retention time of 6 minutes; a fraction that was eluted by 35% after a retention time of 7 minutes (peak 2); a fraction that was eluted by 20% after a retention time of 10 minutes (peak 3); and a fraction that was eluted by 5% after a retention time of 13 minutes (peak 4).

Then, sensory evaluation of kokumi was performed on the commercially-available tea drinks (20° C.). The Scheffe's paired comparison was used as a method for the evaluation. The evaluation was performed on a 5-point scale: +2 if preceding kokumi was stronger than succeeding kokumi, +1 if preceding kokumi was slightly stronger than succeeding kokumi, ±0 if there was no difference between preceding kokumi and succeeding kokumi, −1 if preceding kokumi was slightly weaker than succeeding kokumi, and −2 if preceding kokumi was weaker than succeeding kokumi. Four peak areas of the peaks 1-4 obtained by gel filtration chromatography and the results of the sensory evaluation were shown on a figure to determine a correlation; a correlation was obtained only in the peak 1. This result showed that the component that gave kokumi to a green tea drink is a void fraction detected by absorption at 400 nm in gel filtration chromatography. A molecular weight corresponding to the peak 1 was 300,000 or above in pullulan equivalent. Most of the commercially-available tea drinks contained 0-0.2 μg/ml of the peak 1 component (pigment equivalent).

Test Example 2

Kinds of Tea Leaves

Amounts of a soluble macromolecular component indicated by the peak 1 in various tea leaves were compared. Specifically, 200 mL of warm water (70° C.) was added to 1.4 g of each of the following seven kinds of tea leaves: (a) Gyokuro brewed for the second time, (b) Kabusecha brewed for the second time, (c) Sencha brewed for the third time, (d) Kamairi Tamaryokucha, (e) Fukamushicha brewed for the second time, (f) Tencha brewed for the first time, and (g) Hojicha. The mixtures were extracted for 5 minutes. Then, the tea leaves were removed, and the resulting solutions were cooled to 20° C. The tea extract solutions thus cooled were subjected to measurement by gel filtration chromatography as in Test Example 1, and sensory evaluation was performed on the respective extraction solutions (20° C.) of the tea leaves.

Further, Tencha (f) was stone ground to obtain stone-ground tea leaves (h) (with an average particle size of 15 μm). To 0.4 g of the stone-ground tea leaves, 200 ml of warm water (35° C.) was added, and the mixture was left for 5 minutes. Then, the mixture was subjected to centrifugal separation to separate and remove solid contents having a large particle size, and the resulting solution was cooled to 20° C. to obtain a suspension of the stone-ground tea leaves. The suspension was evaluated likewise.

Figure 2:
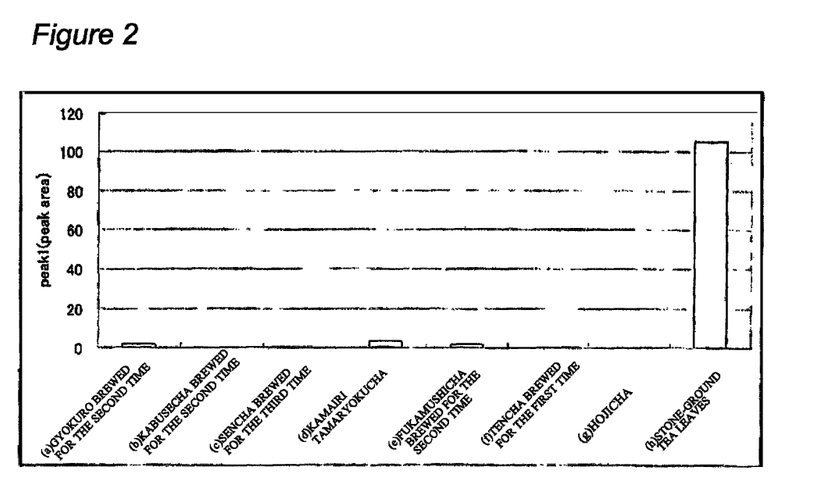
FIG. 2 is a graph showing peak areas of a component in various tea extract solutions that is specified by peak 1 in gel filtration chromatography.

The results of measurement of the peak 1 areas by gel filtration chromatography are shown in FIG. 2. It was found that the peak 1 component was eluted very little in the extract solutions of tea leaves, whereas a large amount of the peak 1 component was eluted in the case in which tea leaves were ground. Among the extract solutions of tea leaves, only high quality tea leaves, such as (a) Gyokuro, (d) Kamairi Tamaryokucha, and (e) Fukamushicha, contained the peak 1 component in a very small amount. It was confirmed as a result of the sensory evaluation that there was a correlation between an amount of the peak 1 component and kokumi. The stone-ground tea leaves (h) had rich kokumi and rich taste even when the tea was consumed while it was at a room temperature or below (20° C.). This taste was robust natural sweetness that could be sensed when high-quality tea that was brewed in a teapot was consumed while it was hot. The taste had smooth mouthfeel and robust sweetness, and there was no unpleasant mouthfeel or texture such as stickiness and sliminess.

Test Example 3

Grinding Conditions

Tencha leaves were ground under the conditions specified below to prepare ground tea leaves. Specifically, the following three kinds of ground tea leaves were prepared: stone-ground tea leaves (i; average particle size: 15 μm); tea leaves prepared by further stone grinding the stone-ground Tencha (i) (stone-ground (fine particle size), average particle size: 11 μm) (j); and tea leaves ground by use of a machine (jetmill) (k; average particle size: 16 μm).

Tea suspensions of the ground tea leaves were prepared as in Test Example 2, and subjected to measurement by gel filtration chromatography as in Test Example 1 to determine peak areas of the peak 1 component, and sensory evaluation was performed.

Figure 3:
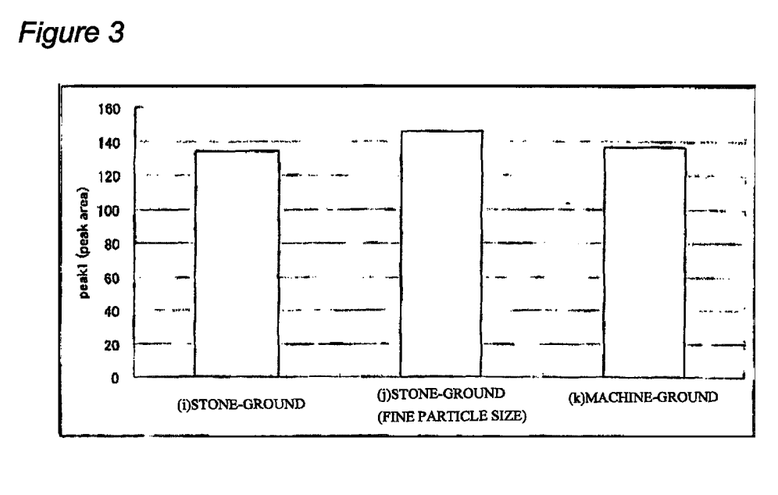
FIG. 3 is a graph showing peak areas of the component in tea extract solutions that is specified by peak 1 in gel filtration chromatography, which tea extract solutions are obtained from tea leaves prepared by grinding under different grinding conditions.

The results are shown in FIG. 3. Comparable levels of the peak 1 component were eluted regardless of grinding sizes and grinding methods, and comparable levels of kokumi were sensed in the sensory evaluation. Especially the stone-ground tea leaves (fine particle size) had more Kokumi of the peak 1 component. Note that it was confirmed that cell walls of all of the ground tea leaves were broken.

Test Example 4

Types of Ground Tea Leaves

Since elution of the peak 1 component was observed slightly in high-quality tea leaves in Test Example 2, various tea leaves (total eight kinds, e.g., Gyokuro brewed for the first time, Sencha brewed for the third time, Kabusecha brewed for the second time, Hojicha brewed for the fourth time, and Bancha brewed for the third time) were used as raw materials and ground to have a similar particle size, whereby ground tea leaves were prepared. Suspensions of the ground tea leaves were obtained by the same method as that used in Test Example 2, and evaluated likewise.

Figure 4:
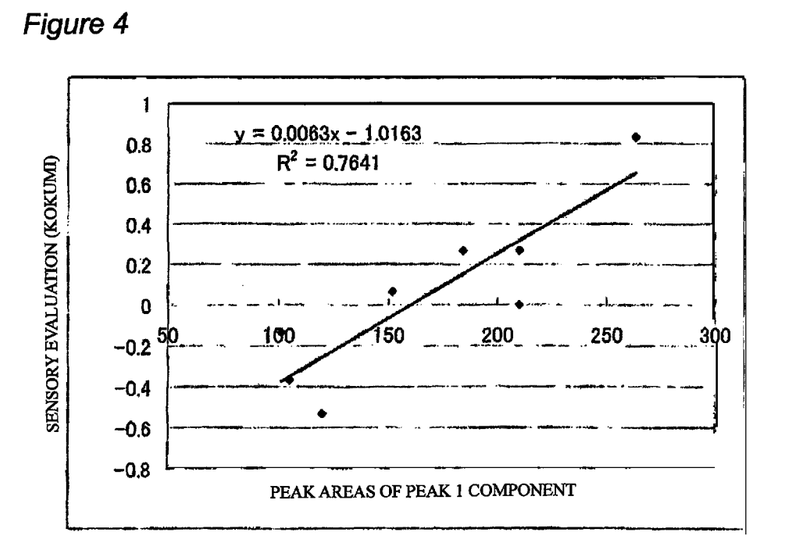
FIG. 4 is a graph showing a correlation between sensory evaluation and the peak areas of the component specified by peak 1 in gel filtration chromatography.

The results are shown in FIG. 4. As in Test Example 1, there was a strong correlation between the peak areas of the peak 1 component and kokumi in the sensory evaluation (20° C.); it was confirmed that the void fraction detected by absorption at 400 nm in gel filtration chromatography was the component that provided kokumi to the green tea drink.

Test Example 5

Processing by High Pressure Homogenizer

A suspension (20° C.) of the stone-ground tea leaves (h) of Test Example 2 was processed by a high pressure homogenizer at a pressure of 15 Mpa to obtain a tea extract solution. As in Test Example 1, measurement by gel filtration chromatography was performed to determine peak areas of the peak 1 component, and sensory evaluation was performed.

The results are shown in FIG. 5. It was confirmed that the processing by the homogenizer led to elution of a greater amount of the peak 1 component. In the sensory evaluation, the tea extract solution processed by the high pressure homogenizer had stronger kokumi.

Test Example 6

Extraction Temperature

Tea suspensions of the stone-ground tea leaves (h) of Test Example 2 ground by stone were prepared at changed extraction temperatures. The tea suspensions were prepared at changed pressures of the high pressure homogenizer. The resulting tea suspensions were measured by gel filtration chromatography as in Test Example 1 to determine peak areas of the peak 1 component, and sensory evaluation was performed.

The results are shown in FIG. 6. While the extraction temperatures had almost no impact on elution of the peak 1 component, an eluted amount increased according to the pressures of the homogenizer. The same trends were observed in consumption and in evaluation of kokumi, suggesting that the processing of ground tea leaves by the high pressure homogenizer was effective in extracting a kokumi enhancing component.

Test Example 7

Peak 1 Component

The extract solution (suspension) of ground tea leaves that was prepared in Test Example 5 and processed by the high pressure homogenizer was frozen. Two grams of this frozen sample was dissolved in 20 ml of distilled water, followed by centrifugal separation (8000 rpm, 5 minutes). The supernatant solution was subjected to gel filtration chromatography to fractionate the peak 1 component (void fraction), followed by freeze-drying. The fractionated void fraction was 168 mg. This was dissolved into 100 ml of distilled water, acidified with 10 ml of 5% sulfuric acid, and extracted twice with 100 ml of ethyl acetate. Ethyl acetate-soluble fraction was concentrated and dried to obtain 52 mg. This was developed by TLC (developer solvent; CH3Cl/MeOH/water=65/25/4) and visualized by use of 5% sulfuric acid.

Figure 7:
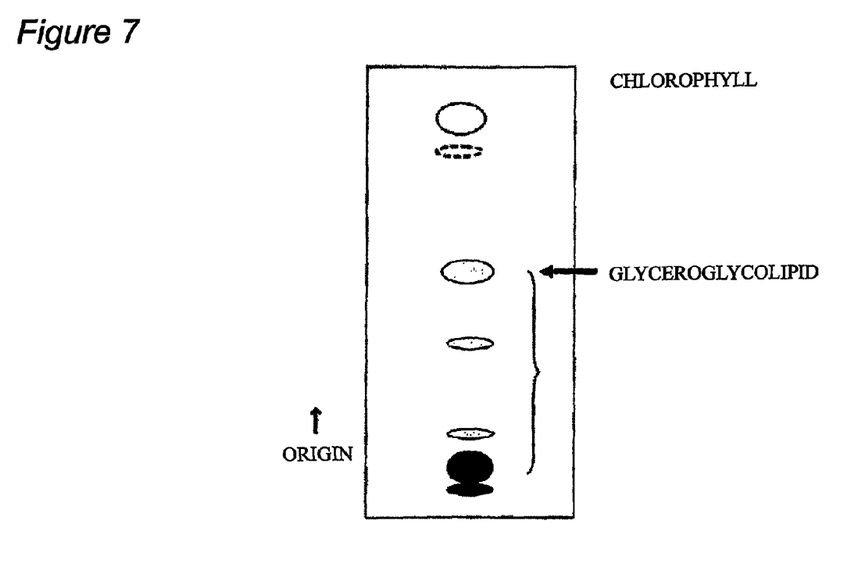
FIG. 7 figure shows results of TLC analysis performed on the component specified by peak 1.

The results are shown in FIG. 7. Chlorophyll and three kinds of glyceroglycolipids were confirmed.

This ethyl acetate layer was subjected to HPLC. Conditions of the measurement by HPLC are as follows.

Column: Silica gel column (Cosmosil 5C18AR, 4.6×150 mm)

Eluant: A 50% MeOH, B 100% MeOH

| Gradient: | 0-10 minutes | A 100% to B 0% |
| --- | --- | --- |
| | 10-20 minutes | A 0% to B 100% |
| | 20-20.5 minutes | A 0% to B 100% |
| | 20.5-25 minutes | A 100% to B 0% |

Flow rate: 1 mL/min.

Detection: 210 nm

Figure 8:
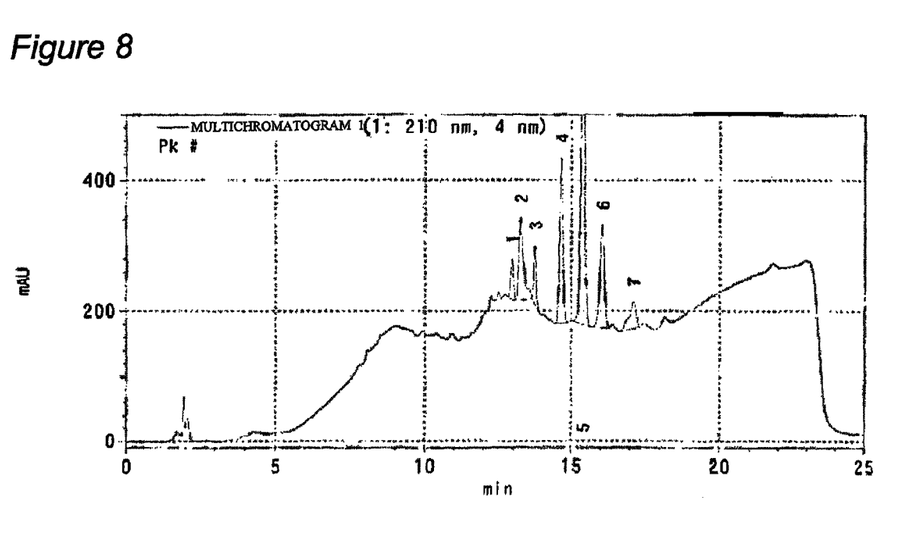
FIG. 8 is a chart showing results of HPLC analysis performed on the component specified by peak 1.

The results are shown in FIG. 8. Glyceroglycolipid is a component represented by the following formula

[Compound 1]

wherein R1 and R2 are fatty acids, and R is H or galactose. The peak component separated by HPLC was analyzed by NMR, and it was found that the peak component contained glyceroglycolipid.

Test Example 8

Identification of Taste (Kokumi) Enhancing Component

A fraction of a Maccha extract solution that had a molecular weight of at least 300,000 was further fractionated, and sensory evaluation and analysis by reverse chromatography were performed on the resulting fraction.

To 0.4 g of stone-ground tea leaves, 200 ml of warm water (35° C.) was added, and the mixture was left for 5 minutes. Then, the mixture was subjected to centrifugal separation to separate and remove solid contents having a large particle size. Thereafter, insoluble solid contents were removed at room temperature by use of a membrane filter (with a pore size of 0.45 µm, JUJI FIELD INC., unsterilized water system 13A). Then, pressure filtration was performed by use of an ultrafiltration membrane (Millipore, Biomax PBMK ultrafiltration disk, polyether sulfone, 300,000 NMWL), and a component on the membrane was recovered to obtain a taste (kokumi) enhancing component having a molecular weight of at least 300,000. This was dissolved in water, acidified with HCl, and subjected to liquid-liquid distribution with ethyl acetate. Among the products of the liquid-liquid distribution, an ethyl acetate layer was adsorbed onto an ODS solid-phase extraction cartridge (Waters, Sep-Pak Plus C18), and was fractionated and eluted in a water-ethanol mixed solvent while a concentration of the ethanol was sequentially changed.

The results of sensory evaluation of a water layer at the time of the liquid-liquid distribution and fractions obtained by the ODS fractionation are shown in the table below. Among the layers, only the fraction obtained by ODS fractionation and elution in 100% ethanol had characteristic rich kokumi of Maccha.

TABLE 1

| | | ETHYL ACETATE LAYERS | | | | |
|---|---|---|---|---|---|---|
| | WATER LAYER | FRACTION OBTAINED BY ODS FRACTIONATION AND ELUTION WITH 0% ETHANOL | FRACTION OBTAINED BY ODS FRACTIONATION AND ELUTION WITH 25% ETHANOL | FRACTION OBTAINED BY ODS FRACTIONATION AND ELUTION WITH 50% ETHANOL | FRACTION OBTAINED BY ODS FRACTIONATION AND ELUTION WITH 75% ETHANOL | FRACTION OBTAINED BY ODS FRACTIONATION AND ELUTION WITH 100% ETHANOL |
| KOKUMI | X | X | X | X | Δ | ◎ |

The respective fractions thus obtained were subjected to reverse chromatography, and quantitative analysis of glyceroglycolipids was performed. Analysis conditions are as follows.

Reverse column: TSK-GEL (TOSOH, inner diameter 4.6 mm×length 150 mm)

Amount of introduced sample: 10 µl

Flow rate: 1.0 ml/min.

RI detector: RIA-10A of SHIMADZU

Eluant: 95% methanol

Temperature: 40° C.

MGDG and DGDG of Lipid Products were used as preparations in the quantitative analysis. Among the preparations, MGDG is divided roughly into two peaks; since a peak exhibited in the tea drinks was a succeeding peak, concentrations were prorated on the basis of proportions of the peak areas of the preparations to determine analysis concentrations. Unless otherwise specified, a total amount of MGDG and DGDG is used to indicate a concentration of glyceroglycolipids in this specification.

Figure 9:
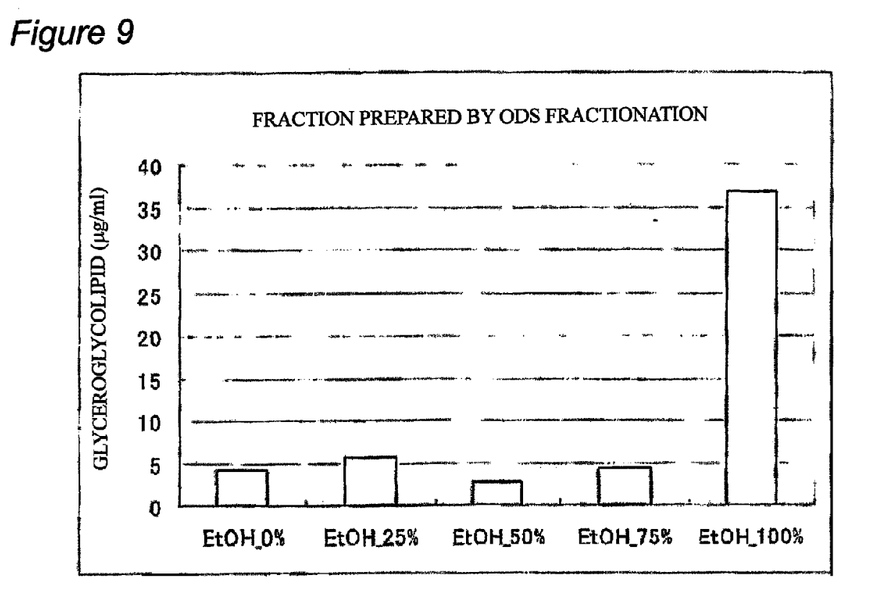
FIG. 9 is an HPLC chart of fractions of a taste (kokumi) improving composition.

The results of the analysis are shown in FIG. 9. Glyceroglycolipids were detected only in the fraction obtained by ODS fractionation and elution in 100% ethanol. It was identified from the results that glyceroglycolipids was the taste (kokumi) enhancing component.

TABLE 2

|  | DGDG (ug/ml) | MGDG (ug/ml) | TOTAL GLYCERO GLYCOLIPID (ug/ml) | TOTAL GLYCERO GLYCOLIPID (mg/1 g TEA LEAVES) |
|---|---|---|---|---|
| TEA LEAVES EXTRACTED IN WARM WATER | 0.017 | 0.057 | 0.074 | 0.011 |
| MACCHA EXTRACTED IN WARM WATER | 0.213 | 0.311 | 0.524 | 2.622 |

Test Example 9

Tea Leaves for Use and Processing Conditions Thereof

Figure 10:
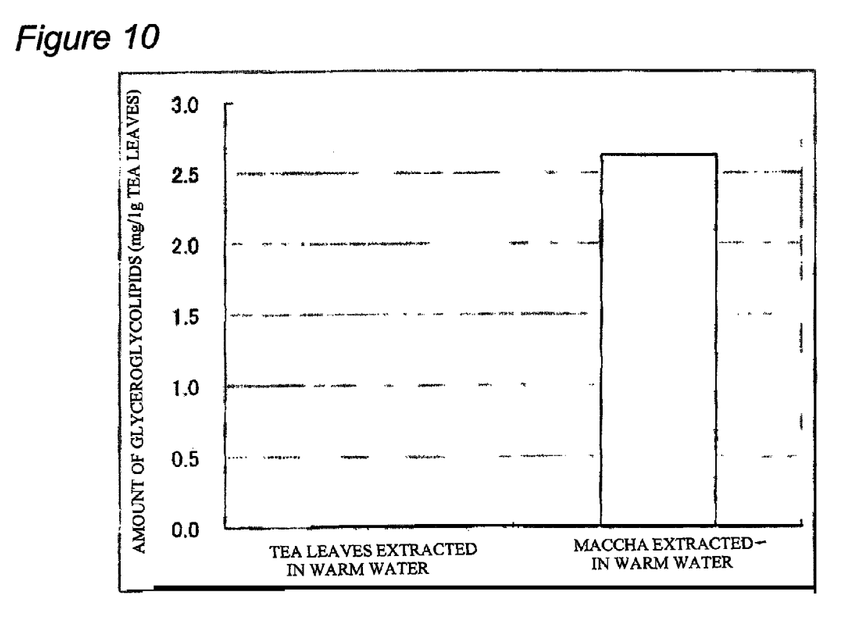
FIG. 10 shows an amount of glyceroglycolipids contained in an extract of tea leaves in warm water and an amount of glyceroglycolipids contained in an extract of Maccha in warm water.

To 1.4 g of common Sencha tea leaves, 200 ml of warm water (70° C.) was added to extract the tea leaves for 5 minutes. Then, the tea leaves were removed, and the resulting solution was cooled to 20° C. Further, 200 ml of warm water (35° C.) was added to 0.4 g of Maccha, and the mixture was left for 5 minutes to obtain a Maccha suspension. They were subjected to reverse chromatography as in Test Example 2, and amounts of glyceroglycolipids were measured. It was confirmed that the extract of the tea leaves extracted in the warm water contained almost no glyceroglycolipid, whereas the extract of Maccha extracted in the warm water contained a large amount of glyceroglycolipids (refer to the following table and FIG. 10).

TABLE 3

|  | DGDG (ug/ml) | MGDG (ug/ml) | TOTAL of GLYCERO GLYCOLIPIDS (ug/ml) | TOTAL of GLYCERO GLYCOLIPIDS (mg/1 g TEA LEAVES) |
|---|---|---|---|---|
| MACCHA ADDED DIRECTLY | 0.213 | 0.311 | 0.524 | 2.622 |
| HOMOGENIZED MACCHA | 3.651 | 6.034 | 9.685 | 4.842 |

Figure 11:
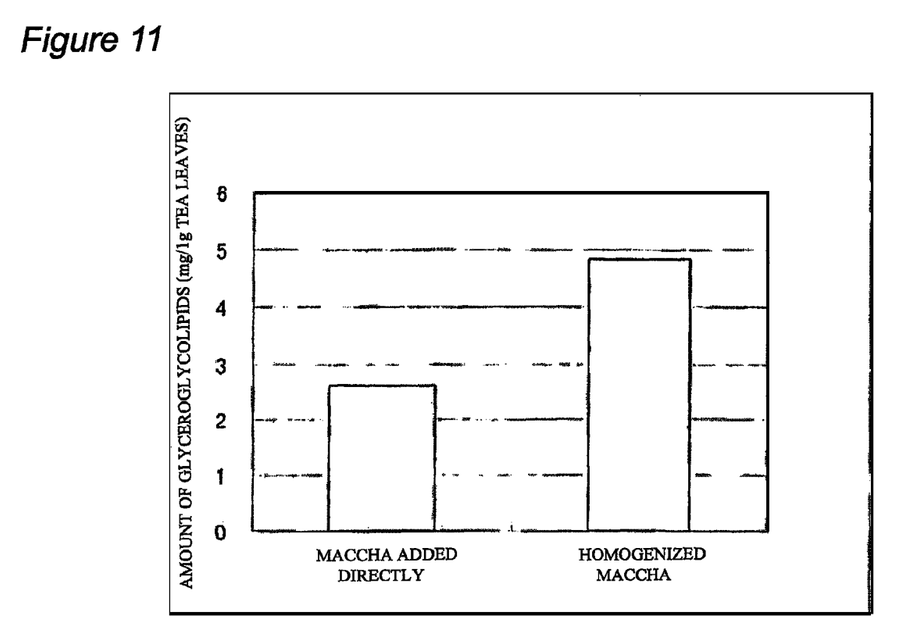
FIG. 11 shows how processing by a high pressure homogenizer affects elution of glyceroglycolipids.

The Maccha suspension (20° C.) was processed by a high pressure homogenizer at a pressure of 15 Mpa to obtain a tea extract solution. The tea extraction solution was subjected to reverse chromatography by the same process as that described above to determine an amount of glyceroglycolipid. It was confirmed that the fine grinding by the high pressure homogenizer led to an increased amount of eluted glyceroglycolipids (refer to FIG. 11). In sensory evaluation, the tea extract solution processed by the high pressure homogenizer had stronger kokumi.

Example 1

Production of Taste-improving Agent

Maccha (finely ground tea leaves) that was prepared by stone grinding Tencha was suspended in about eightyfold water. This suspension was processed by a high pressure homogenizer at a pressure of 15 MPa, and subjected to centrifugal separation (6000 rpm, 10 minutes) to separate and remove at least 99% of solid contents having a particle size of 1 μm or larger, whereby a dispersion of the ground tea leaves containing insoluble solid contents (ground tea leaves) having an average particle size of smaller than 1 μm was obtained. The suspension was analyzed by gel filtration chromatography as in Test Example 1. Further, yellow pigment No. 4 was analyzed likewise to prepare a standard curve, and a concentration (μg/ml; pigment equivalent) of a peak 1 component in the dispersion of the ultrafine ground tea leaves was calculated on the basis of a peak 1 area. About 50 μg/ml of the peak 1 component was contained. Further, the suspension was analyzed by reverse chromatography as in Test Example 8. About 20 μg/ml of glyceroglycolipids was contained.

Example 2

Production of Tea Drinks (1)

Various concentrations (taste-improving agent:green tea extract solution=0-5:10-5) of the taste-improving agents (taste-improving agent containing 20 μg/ml of glyceroglycolipid) prepared in Example 1 and containing about 50 μg/ml of the peak 1 component were added to green tea extract solutions to produce tea drinks. The green tea extract solutions serving as bases of the tea drinks were prepared by adding 200 ml of warm water (70° C.) to 1.4 g of tea leaves (common Sencha), extracting the tea leaves for 5 minutes, and then removing the tea leaves by filtration. The tea drinks thus produced were subjected to centrifugal separation under various conditions to produce tea drinks with different absorbencies.

Amounts (pigment equivalent) of the peak 1 component and glyceroglycolipids contained in the tea drinks (10 kinds) were determined by the same method as in Example 1. Absorbencies at 680 nm were also measured using a spectrophotometer (spectrophotometer UV-1600 of SHIMADZU). Amounts of catechins contained in the tea drinks were also measured. The measurement of catechins was performed by passing the tea drinks used as samples through a membrane filter (with a pore size of 0.45 μm, JUJI FIELD INC., unsterilized water system 13A) to remove solid contents, and then subjecting the resulting tea drinks to HPLC analysis. Conditions of the HPLC analysis are as follows.

(HPLC Analysis Conditions)

Analyser: Tosoh Corporation, TOSOH HPLC system LC8020 model II [multistation: LC-8020, pump: CCMC-II, autosampler: AS-8021, detector: UV-8020, column oven: CO-8020, on-line degasser: SD-8023]

Analysis conditions: [column: TSK gel ODS-80Ts QA, eluant A: 10% acetonitrile/water 0.05% TFA, eluant B: 80% acetonitrile/water 0.05% TFA, flow rate: 1.0 ml/min, temperature: 40° C., detection: UV275 nm]

The tea drinks were cooled to 5° C., and sensory evaluation was performed on the tea drinks by specialized panelists. Kokumi at a time of consuming and a clear sensation immediately after consuming (aftertaste) were evaluated on a 5-point scale (5 points: strongly sensed, 4 points: sensed, 3 points: slightly sensed, 2 points: sensed little, 1 point: not sensed), and averages were calculated. Bitterness and astringent taste originating from catechins, and astringency originating from the ground tea leaves were also evaluated.

The tea drinks were put into 500-ml PET bottles, sterilized (130° C., 1 minute), and then stored at room temperature for one month. Then, visual inspection was performed to determine whether there was any precipitate.

Figure 12:
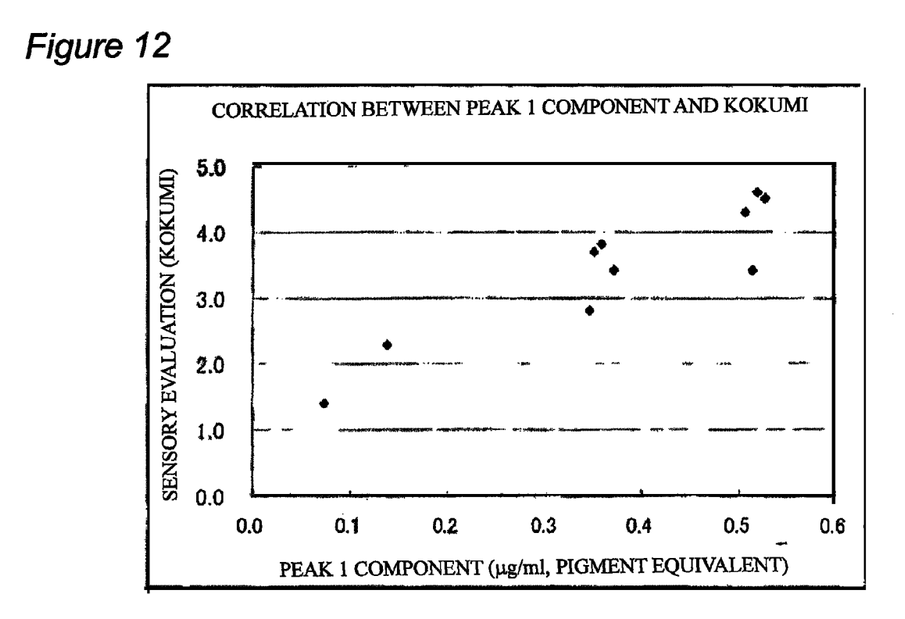
FIG. 12 shows a correlation between the component specified by peak 1 and points given in sensory evaluation of kokumi.
Figure 13:
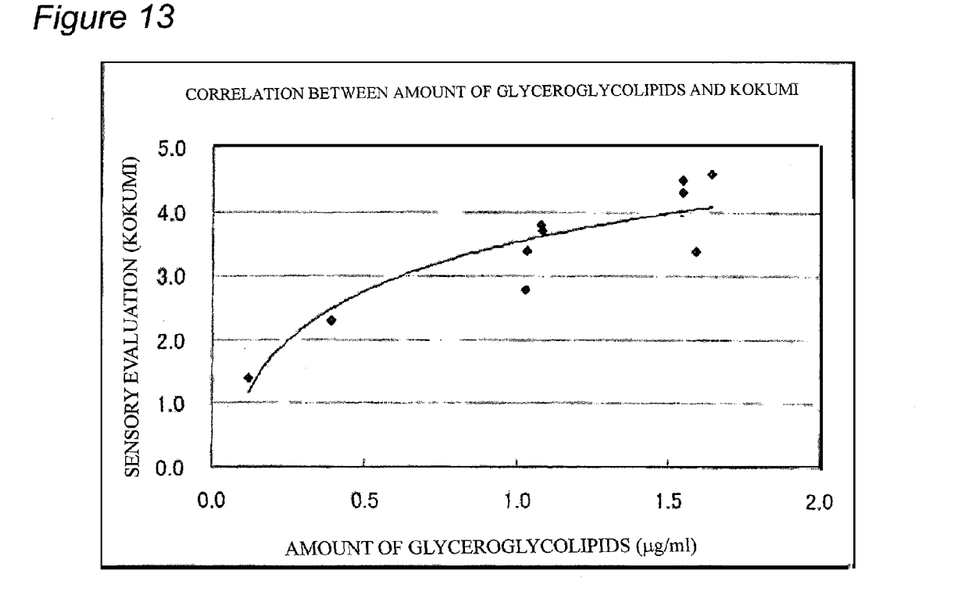
FIG. 13 shows a correlation between glyceroglycolipids and the points given in the sensory evaluation of kokumi.

The results are shown in Tables 4 and 5. Kokumi in sensory evaluation had a correlation with the peak 1 component and the glyceroglycolipid content (FIGS. 12 and 13). The tea drinks each containing at least 0.30 μg/ml (at least 1.0 μg/ml of glyceroglycolipid), pigment equivalent, of the peak 1 component had rich kokumi similar to that of tea brewed in a teapot, which conventional packaged tea drinks did not have; especially the tea drinks containing 0.50 μg/ml or above (1.5 μg/ml or above of glyceroglycolipid) had strong kokumi. In the case in which glyceroglycolipids per catechins (GDG/catechins) was 0.001 or below, the tea drinks had strong bitterness and astringent taste of catechins. In the case in which glyceroglycolipids per catechins was greater than 0.001, bitterness and astringent taste of catechins were slightly masked. In the case in which glyceroglycolipids per catechins was 0.003, the tea drinks had umami and kokumi while having moderate astringent Paste. The foregoing suggests that if glyceroglycolipids and catechins in a tea drink are adjusted such that glyceroglycolipids per catechins (GDG/catechins) is 0.002 or above, preferably 0.003 or above, bitterness and astringent taste of catechins are masked so that the tea drink has bitterness and astringent taste in balance with kokumi and is highly drinkable, even when the tea drink is consumed while it is at a refrigerant temperature.

Figure 14:
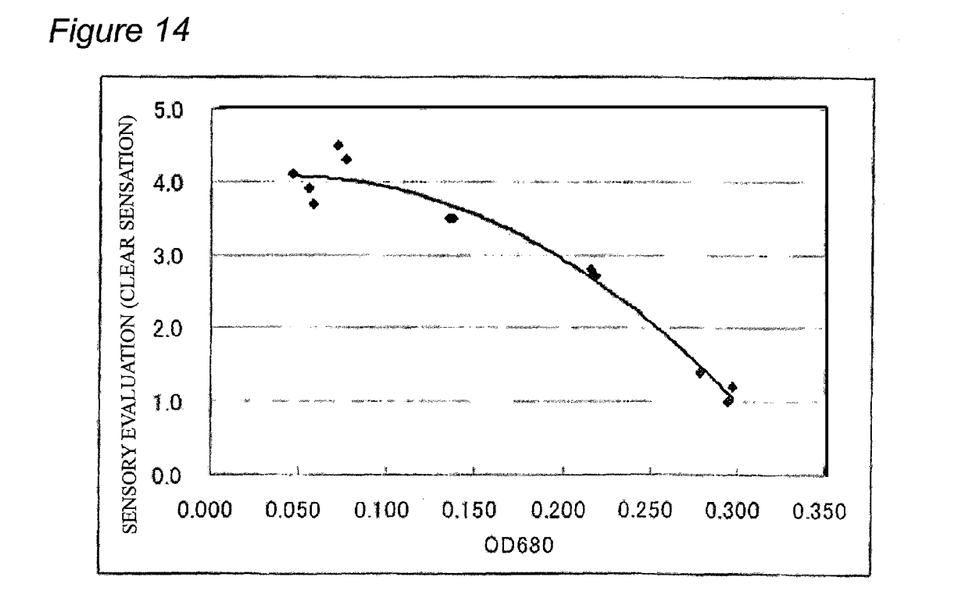
FIG. 14 shows a correlation between an absorbency at 680 nm and points given in sensory evaluation of a sensation of clear taste.

Absorbencies at 680 nm had a negative correlation with a clear sensation in the sensory evaluation (FIG. 14). In the case in which an absorbency was about 0.30, no clear sensation was sensed. In the case in which an absorbency was about 0.25 or below, a clear sensation was obtained. In the case in which a proportion of glyceroglycolipids to insoluble solid contents (GDG/OD680) was about 5, characteristic astringency of the insoluble solid contents, i.e., ground tea leaves, was sensed. In the case in which the GDG/OD680 was 7 or above, characteristic astringency was sensed little. In the case in which the GDG/OD680 was 10 or above, no characteristic astringency was sensed.

Figure 15:
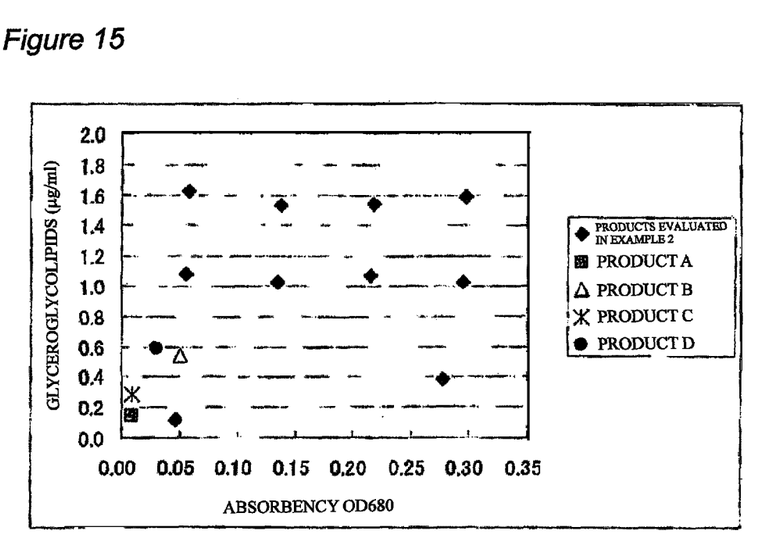
FIG. 15 shows suitable ranges of glyceroglycolipids and turbidity.

The foregoing suggests that tea drinks that have moderate astringent taste and rich kokumi even when the tea drinks are consumed while they are at a refrigerant temperature are a range specified in FIG. 15; more preferably glyceroglycolipids per catechins (GDG/catechins) is 0.002 or above, preferably 0.003 or above, and/or the proportion of glyceroglycolipids to insoluble solid contents (GDG/OD680) is 7 or above, preferably 10 or above. Commercially-available packaged tea drinks were analyzed, but none of then satisfied the range specified in FIG. 15. Sensory evaluation was also performed, but the tea drinks of the present invention had greater overall palatability, compared with those of the conventional tea drinks within the range specified in FIG. 15.

TABLE 4

| SAMPLE | PEAK 1 COMPONENT (PIGMENT EQUIVALENT) (ug/ml) | DGDG (ug/ml) | MGDG (ug/ml) | TOTAL of GLYCEROGLYCOLIPIDS (GDG; ug/ml) | CATECHINS | GDG/ CATECHINS | OD680 | GDG/ OD680 |
|---|---|---|---|---|---|---|---|---|
| 1 | 0.07 | 0.037 | 0.082 | 0.119 | 318.69 | 0.0004 | 0.047 | 47.620 |
| 2 | 0.14 | 0.154 | 0.235 | 0.389 | 319.56 | 0.0012 | 0.278 | 5.465 |
| 3 | 0.35 | 0.397 | 0.631 | 1.028 | 325.86 | 0.0032 | 0.295 | 5.393 |
| 4 | 0.35 | 0.400 | 0.680 | 1.080 | 328.32 | 0.0033 | 0.055 | 30.646 |
| 5 | 0.51 | 0.609 | 0.982 | 1.591 | 331.59 | 0.0048 | 0.298 | 5.421 |
| 6 | 0.52 | 0.613 | 1.031 | 1.643 | 334.04 | 0.0049 | 0.058 | 29.063 |
| 7 | 0.37 | 0.387 | 0.644 | 1.031 | 327.18 | 0.0031 | 0.135 | 12.346 |
| 8 | 0.36 | 0.410 | 0.667 | 1.077 | 327.00 | 0.0033 | 0.216 | 7.543 |
| 9 | 0.50 | 0.581 | 0.965 | 1.546 | 332.43 | 0.0046 | 0.137 | 12.102 |
| 10 | 0.53 | 0.586 | 0.958 | 1.544 | 331.77 | 0.0047 | 0.218 | 7.496 |

TABLE 5

| SAMPLE | KOKUMI | BITTERNESS AND ASTRINGENT TASTE OF CATECHINS | CLEAR SENSATION | ASTRINGENCY | PRECIPITATE |
|---|---|---|---|---|---|
| 1 | 1.4 | SENSED | 3.5 | NONE | NONE |
| 2 | 2.3 | SOME | 2.8 | SENSED | PRESENT |
| 3 | 2.8 | MODERATE | 3.5 | SENSED | PRESENT |
| 4 | 3.7 | MODERATE | 2.7 | NONE | NONE |
| 5 | 3.4 | MODERATE | 4.1 | SENSED | PRESENT |
| 6 | 4.6 | MODERATE | 1.4 | NONE | NONE |
| 7 | 3.4 | MODERATE | 1.0 | NONE | NONE |
| 8 | 3.8 | MODERATE | 3.9 | SOME | NONE |
| 9 | 4.3 | MODERATE | 1.2 | NONE | NONE |
| 10 | 4.5 | MODERATE | 3.7 | SOME | NONE |

Example 3

Production of Tea Drinks (2)

To a green tea extract solution containing no glyceroglycolipid, 0.07 weight % of Maccha with respect to a total amount of the extract solution was added, and the mixture was processed by a high pressure homogenizer and subjected to centrifugal separation to obtain an absorbency within a range shown in FIG. 15.

The analysis and sensory evaluation were performed as in Example 2. The results are shown in Table 6. The tea drinks of the present invention each containing at least 1.0 μg/ml of glyceroglycolipids had rich kokumi similar to that obtained by brewing high-quality tea leaves. The tea drinks had richness and clear sensation.

The tea drinks in the preferred range were sterilized (130° C., 1 minute), but rich kokumi was maintained.

TABLE 6

| SAMPLE | PEAK 1 COMPONENT (PIGMENT EQUIVALENT) (ug/ml) | DGDG (ug/ml) | MGDG (ug/ml) | TOTAL of GLYCEROGLYCOLIPIDS (GDG; ug/ml) | CATECHINS | GDG/ CATECHINS | OD680 | GDG/ OD680 |
|---|---|---|---|---|---|---|---|---|
| 11 | 0.72 | 0.747 | 1.577 | 2.112 | 350.00 | 0.0044 | 0.072 | 29.332 |
| 12 | 0.84 | 0.739 | 1.849 | 2.503 | 365.05 | 0.0042 | 0.076 | 32.939 |

| SAMPLE | KOKUMI | BITTERNESS AND ASTRINGENT TASTE OF CATECHINS | CLEAR SENSATION | ASTRINGENCY | PRECIPITATE |
|---|---|---|---|---|---|
| 11 | 4.8 | MODERATE | 4.1 | NONE | NONE |
| 12 | 5.0 | MODERATE | 4.3 | NONE | NONE |

The invention claimed is:

1. A tea drink comprising a ground tea leaf, at least 1.0 μg/ml of glyceroglycolipids, and 0.10-5.0 mg/ml of catechins; and having an absorbency of 0.25 or below at 680 nm;
   wherein the tea drink comprises 0.002-0.025 parts by weight of the glyceroglycolipids per 1 part by weight of catechins; and
   wherein the proportion of glyceroglycolipids to an insoluble solids content, calculated as $$\frac{\text{amount of glyceroglycolipids}\,(\mu g/ml)}{\text{absorbency at 680 nm}},$$

is 7 or above.

2. The tea drink of claim 1 comprising at least 1.5 μg/ml of glyceroglycolipids.

3. The tea drink of claim 1, wherein the tea drink comprises 0.002-0.020 parts by weight of the glyceroglycolipids per 1 part by weight of catechins.

4. The tea drink of claim 1, wherein the tea drink comprises 0.003-0.015 parts by weight of the glyceroglycolipids per 1 part by weight of catechins.

5. The tea drink of claim 1, wherein the proportion of the glyceroglycolipids to an insoluble solid content, calculated as $$\frac{\text{amount of glyceroglycolipids}\,(\mu g/ml)}{\text{absorbency at 680 nm}},$$

is 10 or above.

6. The tea drink of claim 1, wherein the proportion of the glyceroglycolipids to an insoluble solid content, calculated as $$\frac{\text{amount of glyceroglycolipids}\,(\mu g/ml)}{\text{absorbency at 680 nm}},$$

is 12 or above.

7. The tea drink of claim 1 comprising 0.20-4.0 mg/ml of catechins.

8. The tea drink of claim 1 comprising 0.25-3.0 mg/ml of catechins.

9. The tea drink of claim 1 comprising 0.30-2.0 mg/ml of catechins,

10. The tea drink of claim 1 comprising 0.35-1.0 mg/ml of catechins.

* * * * *